US012713513B2

(12) United States Patent
Kimura et al.

(10) Patent No.: US 12,713,513 B2
(45) Date of Patent: Aug. 18, 2026

(54) ACCELERATING CAVITY AND METHOD OF MANUFACTURING ACCELERATING CAVITY

(71) Applicants: MITSUBISHI HEAVY INDUSTRIES MACHINERY SYSTEMS, LTD., Kobe (JP); INTER-UNIVERSITY RESEARCH INSTITUTE CORPORATION HIGH ENERGY ACCELERATOR RESEARCH ORGANIZATION, Tsukuba (JP)

(72) Inventors: Masashi Kimura, Hyogo (JP); Nobuyuki Shigeoka, Hyogo (JP); Tetsuo Abe, Ibaraki (JP)

(73) Assignees: MITSUBISHI HEAVY INDUSTRIES MACHINERY, SYSTEMS, LTD., Kobe (JP); INTER-UNIVERSITY RESEARCH INSTITUTE CORPORATION HIGH ENERGY ACCELERATOR RESEARCH ORGANIZATION, Tsukuba (JP)

( * ) Notice: Subject to any disclaimer, the term of this patent is extended or adjusted under 35 U.S.C. 154(b) by 31 days.

(21) Appl. No.: 19/099,474

(22) PCT Filed: Jun. 23, 2023

(86) PCT No.: PCT/JP2023/023388

§ 371 (c)(1),
(2) Date: Jan. 29, 2025

(87) PCT Pub. No.: WO2024/034273

PCT Pub. Date: Feb. 15, 2024

(65) Prior Publication Data

US 2026/0059644 A1 Feb. 26, 2026

(30) Foreign Application Priority Data

Aug. 12, 2022 (JP) ................................ 2022-129023

(51) Int. Cl.
*H05H 7/18* (2006.01)
*H05H 7/22* (2006.01)

(52) U.S. Cl.
CPC ................ *H05H 7/18* (2013.01); *H05H 7/22* (2013.01); *H05H 2007/222* (2013.01)

(58) Field of Classification Search
None
See application file for complete search history.

(56) References Cited

U.S. PATENT DOCUMENTS 7,339,320 B1 * 3/2008 Meddaugh ............ H05H 9/044
315/5.41
9,497,847 B2 * 11/2016 Sennyu .................... H05H 7/22
(Continued)

FOREIGN PATENT DOCUMENTS

JP H01107499 A 4/1989
JP 2002025800 A 1/2002
(Continued)

OTHER PUBLICATIONS

R. A. Rimmer et al., Development of a High-Power RF Cavity for the Pep-II B Factory, Proceedings 16th Particle Accelerator Conference and International Conference on High-Energy Accelerators, Mar. 1, 1995, pp. 1729-1731, Fig. 5; 3 pp.
(Continued)

*Primary Examiner* — Wilson Lee
(74) *Attorney, Agent, or Firm* — HAUPTMAN HAM, LLP

(57) ABSTRACT

An accelerating cavity includes: a housing that is conductive, has a tubular shape, and is formed by joining a plurality of part members parted by a planar parting surface along a central axis; a plurality of cells that are arranged in the housing along an axial direction of the central axis of the housing, and are connected to each other by a communicat-
(Continued)

ing portion that allows charged particles to pass through; and a protrusion that is disposed at a position surrounding the communicating portion of each of the cells in the housing, protrudes toward an inner side of the cell in the axial direction, and has a shape becoming larger in a radial direction with respect to the central axis from a tip end portion toward a base end portion in the axial direction.

3 Claims, 10 Drawing Sheets

(56) References Cited

U.S. PATENT DOCUMENTS

| | | | | |
|---|---|---|---|---|
| 2003/0146704 | A1* | 8/2003 | Ding | H05H 7/18 315/505 |
| 2019/0394868 | A1* | 12/2019 | Okazaki | G03F 7/70033 |
| 2020/0068699 | A1* | 2/2020 | Kutsaev | H05H 9/045 |
| 2020/0214119 | A1* | 7/2020 | He | H05H 9/044 |
| 2020/0343081 | A1* | 10/2020 | McBride | F04B 35/04 |
| 2021/0183638 | A1* | 6/2021 | Nishiguchi | H01J 49/421 |
| 2022/0039246 | A1 | 2/2022 | Agustsson et al. | |
| 2022/0087005 | A1* | 3/2022 | He | H05H 7/22 |
| 2022/0367141 | A1* | 11/2022 | Cameron | H01J 37/265 |
| 2023/0082826 | A1 | 3/2023 | Agustsson et al. | |
| 2023/0282386 | A1* | 9/2023 | Yokoyama | G21K 1/087 250/396 R |

FOREIGN PATENT DOCUMENTS

| | | | | |
|---|---|---|---|---|
| WO | WO-2005065259 | A2 * | 7/2005 | H05H 9/044 |
| WO | 2020061204 | A1 | 3/2020 | |

OTHER PUBLICATIONS

Written Opinion of the ISA and International Search Report for International Application No. PCT/JP2023/023388 mailed on Aug. 1, 2023; 13 pp.

* cited by examiner

ACCELERATING CAVITY AND METHOD OF MANUFACTURING ACCELERATING CAVITY

RELATED APPLICATIONS

The present application is a National Phase of International Application Number PCT/JP2023/023388 filed Jun. 23, 2023, and claims priority to Japanese Application Number 2022-129023 filed Aug. 12, 2022.

Field

The present disclosure relates to an accelerating cavity and a method of manufacturing an accelerating cavity.

Background

An accelerating cavity accelerates charged particles such as electrons, by generating an accelerating electrical field inside the cavity, with an input of a radio frequency. A known configuration of such an accelerating cavity includes: a plurality of cells that are arranged along an axial direction of the central axis; a communicating portion via which the cells communicate with each other; and a projection, that is what is called a nose cone, provided to each of such cells, at a position surrounding the communicating portion (see, for example, Patent Literature 1).

CITATION LIST

Patent Literature

Patent Literature 1: Japanese Patent Application Laid-open No. HI-107499

SUMMARY

Technical Problem

Recently having come to developed is a technique for manufacturing such an accelerating cavity by forming a plurality of part members parted along a parting surface that is on a plane along the central axis, in advance, and by joining the part members on their parting surfaces. In applications of such a technique to an accelerating cavity having a protrusion (nose cone), such as that disclosed in Patent Literature 1, there is demand for ease of manufacturing.

The present disclosure has been made in consideration of the above, and an object of the present disclosure is to provide an accelerating cavity and a method of manufacturing an accelerating cavity capable of providing ease of manufacturing.

Solution to Problem

An accelerating cavity according to the present disclosure includes: a housing that is conductive, has a tubular shape, and is formed by joining a plurality of part members parted by a planar parting surface along a central axis; a plurality of cells that are arranged in the housing along an axial direction of the central axis of the housing, and are connected to each other by a communicating portion that allows charged particles to pass through; and a protrusion that is disposed at a position surrounding the communicating portion of each of the cells in the housing, protrudes toward an inner side of the cell in the axial direction, and has a shape becoming larger in the radial direction from a tip end portion toward a base end portion in the axial direction as the shape is away from the parting surface in a rotating direction about the central axis.

A method of manufacturing an accelerating cavity according to the present disclosure is for manufacturing an accelerating cavity including: a housing that is conductive, that has a tubular shape, and that is formed by joining a plurality of part members parted by a planar parting surface along a central axis; a plurality of cells that are arranged in the housing along an axial direction of the central axis of the housing, and that are connected to each other by a communicating portion that allows charged particles to pass through; and a protrusion that is disposed at a position surrounding the communicating portion of each of the cells in the housing, and that protrudes toward an inner side of the cell in the axial direction. The method includes the steps of: forming a recess corresponding to the plurality of cells and the communicating portion by machining a machined surface of a base material, the machined surface being a surface corresponding to the parting surface; and forming a portion corresponding to the protrusion such that the portion has a shape becoming larger in a radial direction with respect to the central axis from a tip end portion toward a base end portion in the axial direction of the central axis by inserting a machining tool into the recess from a side of the machined surface.

Advantageous Effects of Invention

According to the present disclosure, it is possible to provide an accelerating cavity and a method of manufacturing an accelerating cavity achieving ease of manufacturing.

DESCRIPTION OF EMBODIMENTS

An accelerating cavity and a method of manufacturing an accelerating cavity according to an embodiment of the present disclosure will now be explained with reference to drawings. Note that this embodiment is not intended to limit the present invention in any way. Furthermore, elements described in the following embodiment include those that are replaceable and easily replaceable by those skilled in the art, or those that are substantially identical.

Figure 1:
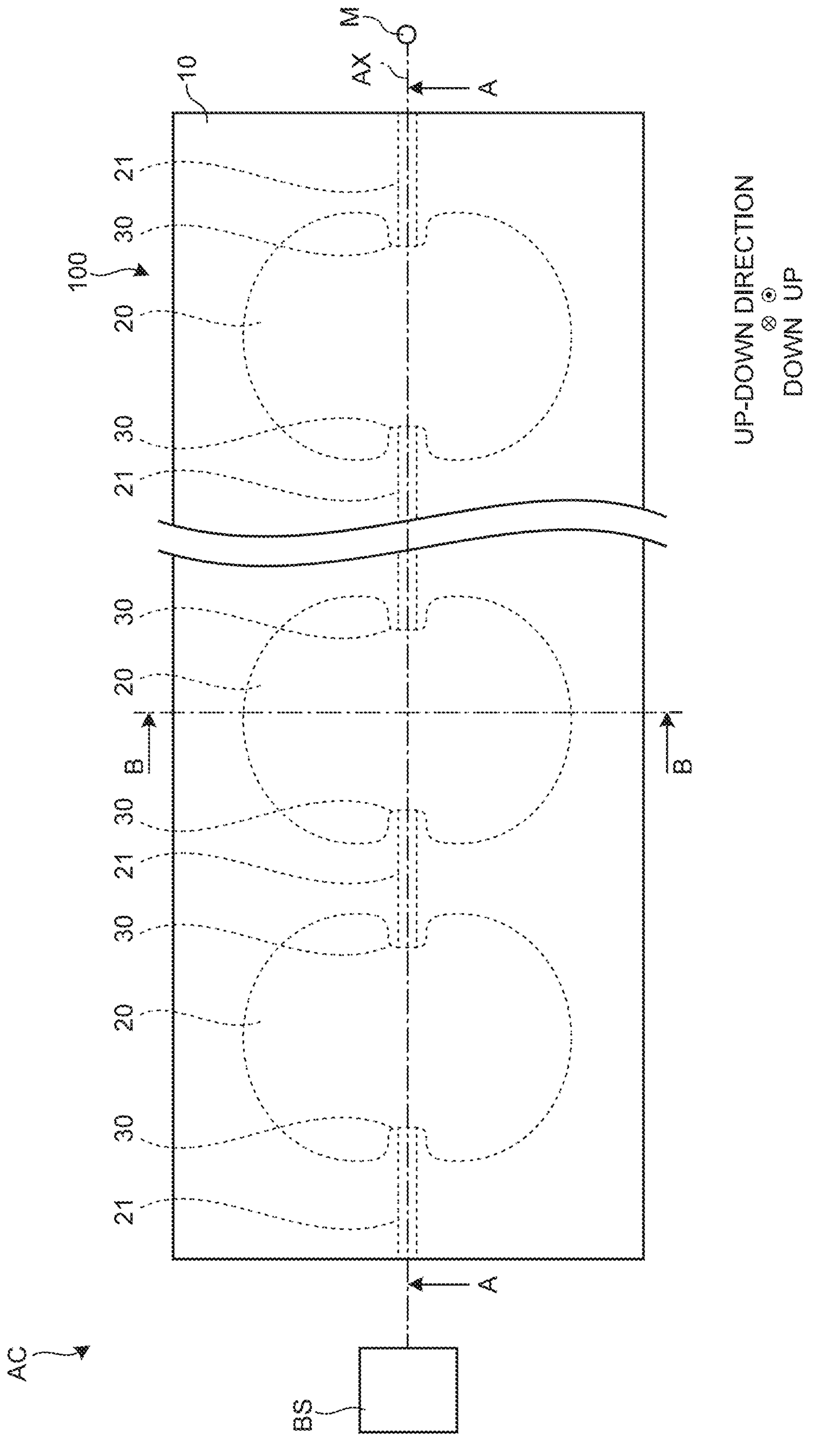
FIG. 1 is a plan view illustrating one example of an accelerating cavity according to an embodiment.
Figure 2:
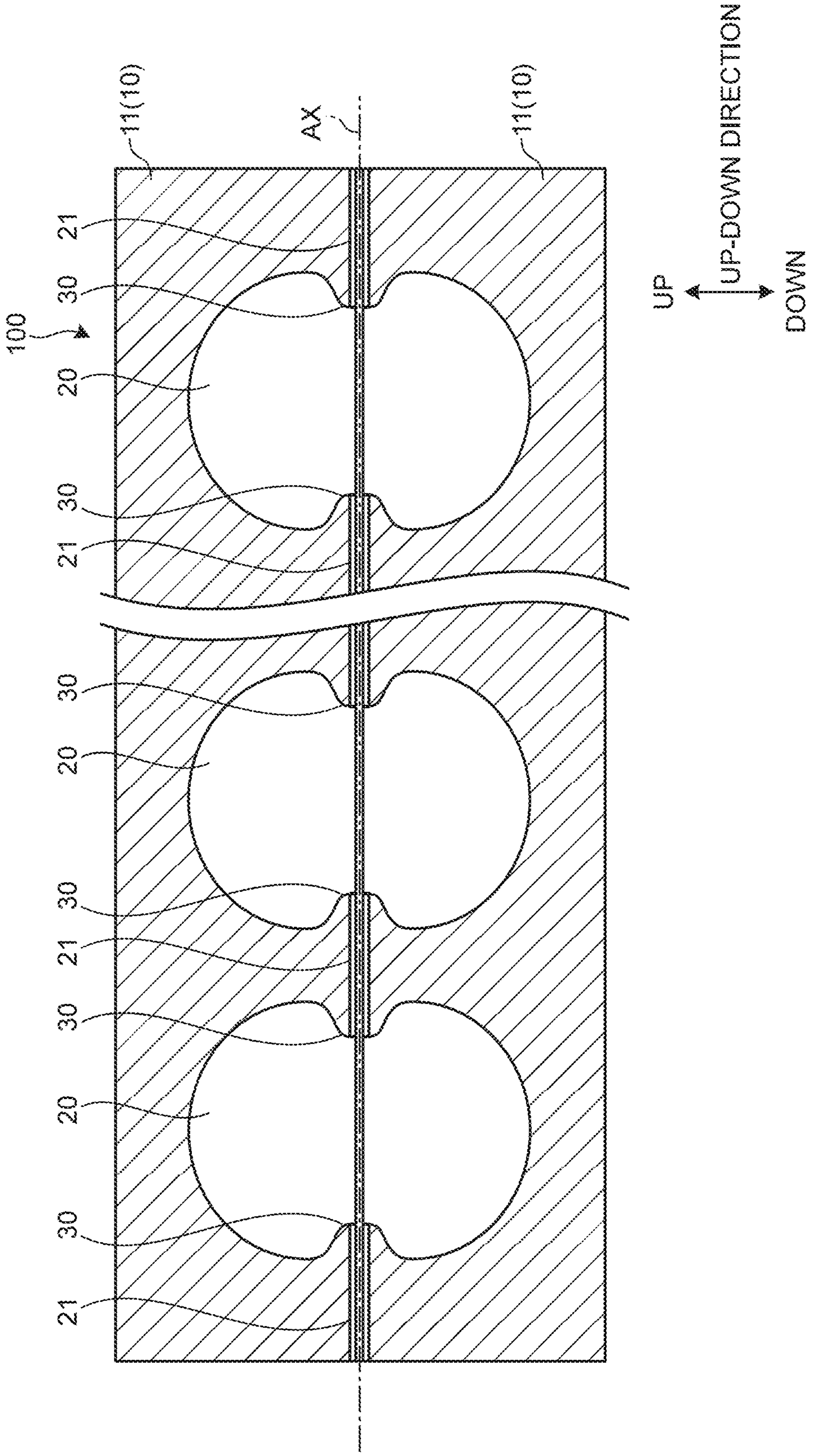
FIG. 2 is a schematic illustrating a cross-sectional configuration along A-A in FIG. 1.
Figure 3:
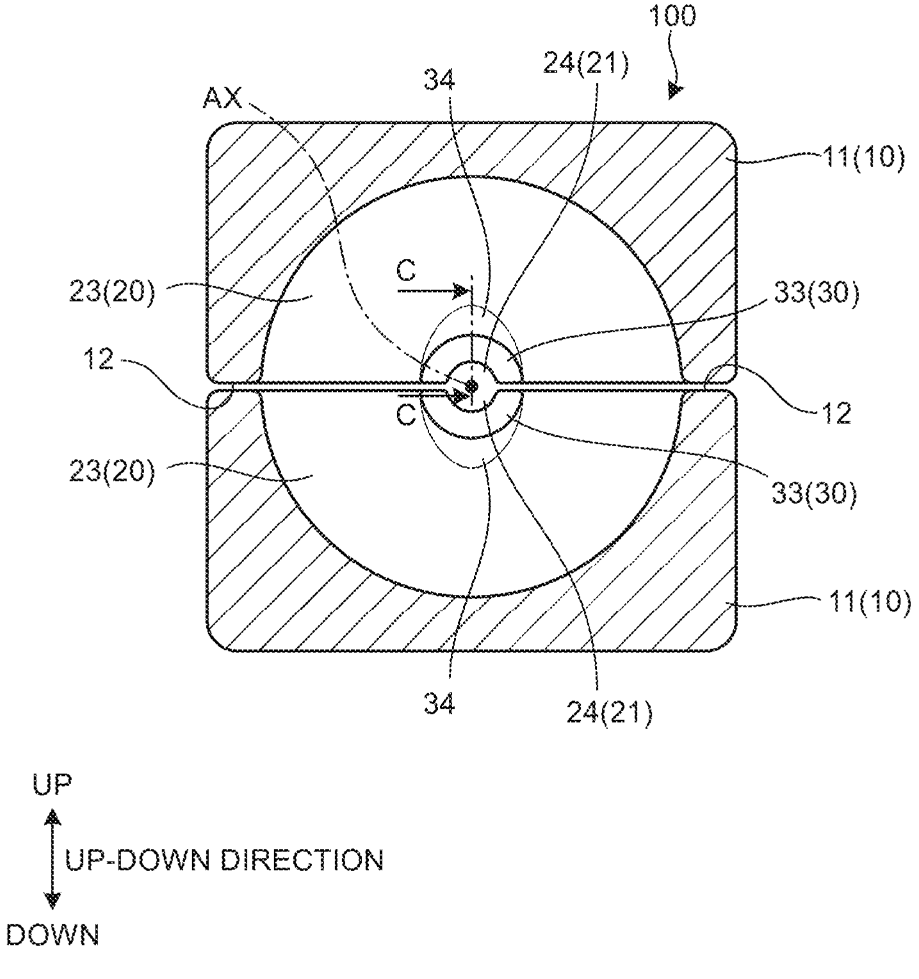
FIG. 3 is a schematic illustrating a cross-sectional configuration along B-B in FIG. 1.

FIG. 1 is a plan view illustrating one example of an accelerating cavity 100 according to the embodiment. FIG. 2 is a schematic illustrating a cross-sectional configuration along A-A in FIG. 1. FIG. 3 is a schematic illustrating a cross-sectional configuration along B-B in FIG. 1.

The accelerating cavity 100 illustrated in FIGS. 1 to 3 accelerates charged particles M, such as electrons, emitted from a beam source BS, by generating an accelerating electrical field inside the cavity with an input of a radio frequency. An accelerator AC is configured using the accelerating cavity 100 and the beam source BS. Accelerators AC are used in various fields including academic fields, e.g., for high energy physics experiments or in synchrotron radiation facilities, medical fields, e.g., in radiation therapies or examinations, and industrial fields, e.g., in non-destructive testing. Hereunder, in the description of the axial direction of a central axis AX, among the directions with respect to the accelerating cavity 100, the side of the beam source BS (the side on which the charged particles M become incident) will be referred to as an incident side, and the side on the opposite side of the incident side (the side from which the charged particles emerge) will be referred to as an emergent side.

As illustrated in FIGS. 1 to 3, an accelerating cavity 100 according to the embodiment includes a housing 10, a cell 20, and a protrusion 30.

The housing 10 is conductive, and has a tubular shape. The housing 10 is formed of a plurality of joined part members 11. Each of the part members 11 has a planar parting surface 12 along the central axis AX. The part members 11 are joined in a manner having the respective parting surfaces 12 facing each other. The part members 11 are provided in such a manner that the facing parting surfaces 12 form a gap therebetween. In this embodiment, an exemplary configuration in which the housing 10 is parted into two parts including an upper part and a lower part will be explained. The number of parts of the housing 10 is not limited to two, and may be three or more. Each of the part members 11, as a whole, has a rounded shape in portions facing the other part member. With this configuration, a voltage is prevented from being applied to a certain local spot.

The cells 20 are formed in the housing 10. The cells 20 are arranged along the axial direction of the central axis AX of the housing 10. The cells 20 are connected to each other by a communicating portion 21 enabled to pass charged particles. The communicating portion 21 extends along the central axis AX. Each of the cells 20 is formed by combining unit cells 23 that are respectively provided to upper and lower part members 11. The communicating portion 21 is formed by combining unit communicating portions 24 that are respectively provided to the upper and the lower part members 11.

The protrusions 30 are provided to each of the cells 20 in the housing 10. The protrusion 30 is provided at a position surrounding the communicating portion 21. The protrusion 30 is provided on each of the incident side and the emergent side in the axial direction of the central axis AX. The protrusion 30 provided on the incident side of corresponding one of the cells 20 protrudes toward the emergent side, in the axial direction of the central axis AX. The protrusion 30 provided on the emergent side of the cell 20 protrudes toward the incident side, in the axial direction of the central axis AX. In other words, the protrusions 30 protrude toward the inner side of the cell 20. Each of the protrusions 30 is formed by combining unit protrusions 33 that are respectively provided to the upper and the lower part members 11.

Figure 4:
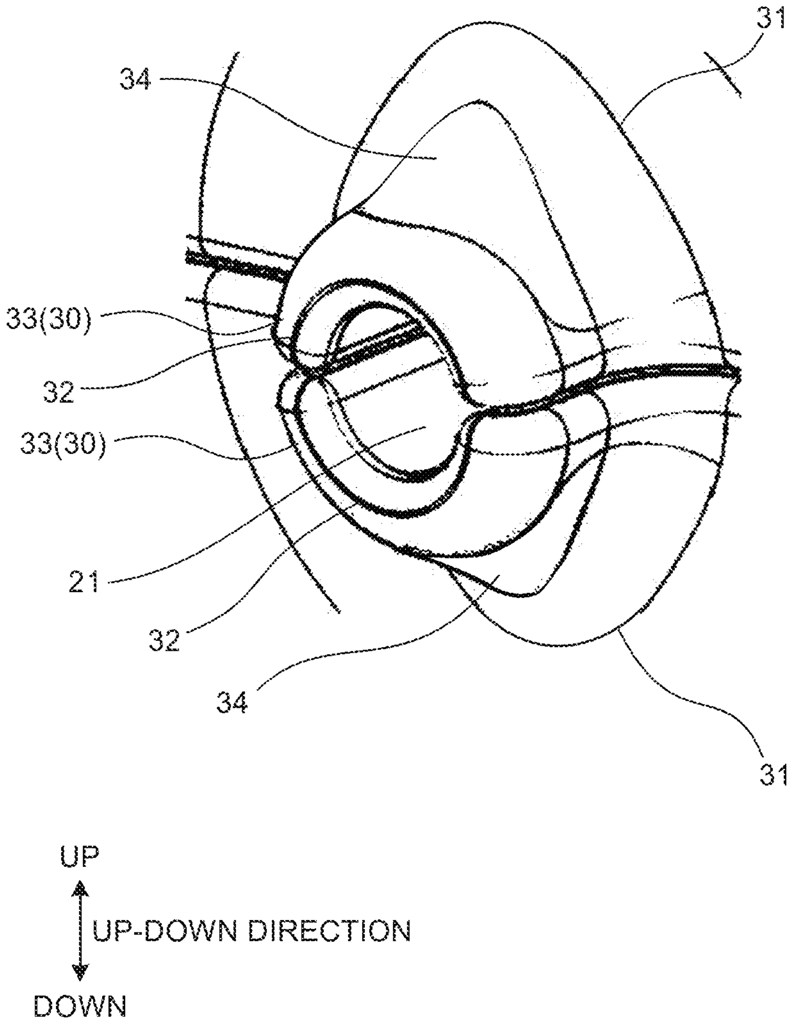
FIG. 4 is a perspective view illustrating one example of a protrusion.

FIG. 4 is a perspective view illustrating one example of the protrusion 30. FIG. 4 illustrates the configuration of the protrusion 30 in a view from the side of the tip end portion 32.

The protrusion 30 has a shape becoming larger in the radial direction with respect to the central axis AX from the tip end portion 32 toward the base end portion 31 in the axial direction of the central axis AX. The radial direction is a radiating direction in a view along the axial direction of the central axis AX.

Figure 5:
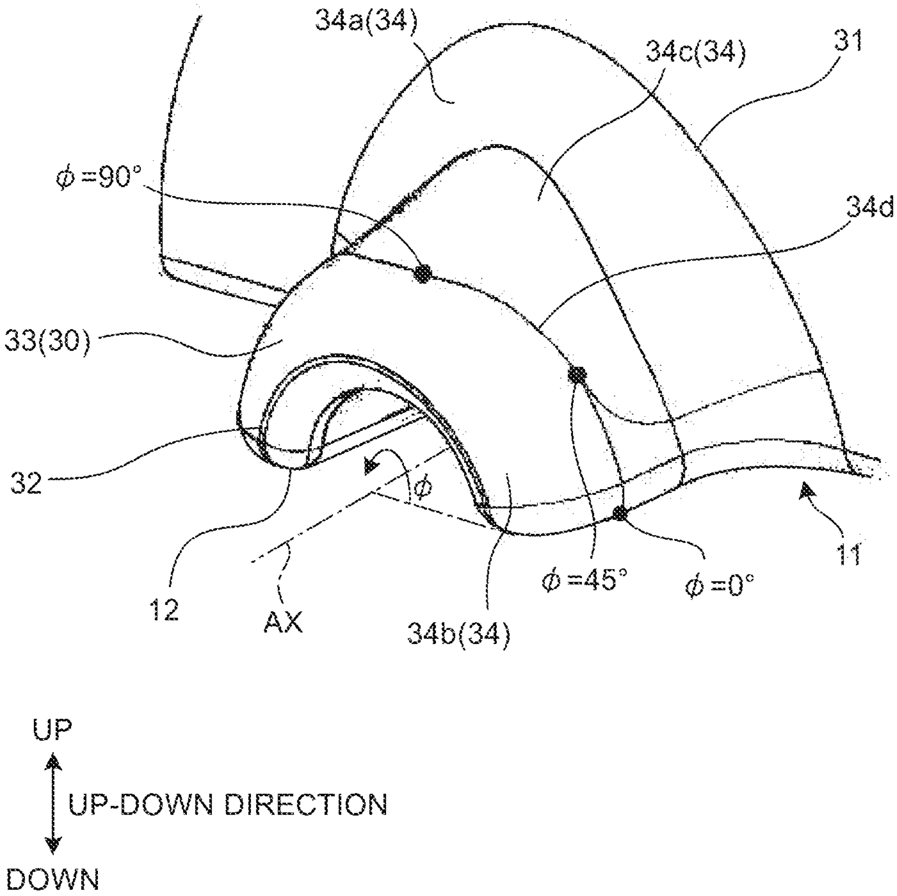
FIG. 5 is a perspective view illustrating one example of a unit protrusion on one part member.

The protrusions 30 are formed by the unit protrusions 33 that are provided to each of the part members 11. FIG. 5 is a perspective view illustrating one example of a unit protrusion 33 on one of the part members 11. The unit protrusion 33 has a shape becoming larger in the radial direction as the shape is away from the parting surface 12 in a rotating direction about the central axis AX. In FIGS. 4 and 5, a virtual line indicating the boundary between a base-end side curved portion 34*a* and a connecting portion 34*c* and a virtual line indicating the boundary between a tip-end side curved portion 34*b* and the connecting portion 34*c*, to be described later, are illustrated, but these boundaries are actually not visible.

Figure 6:
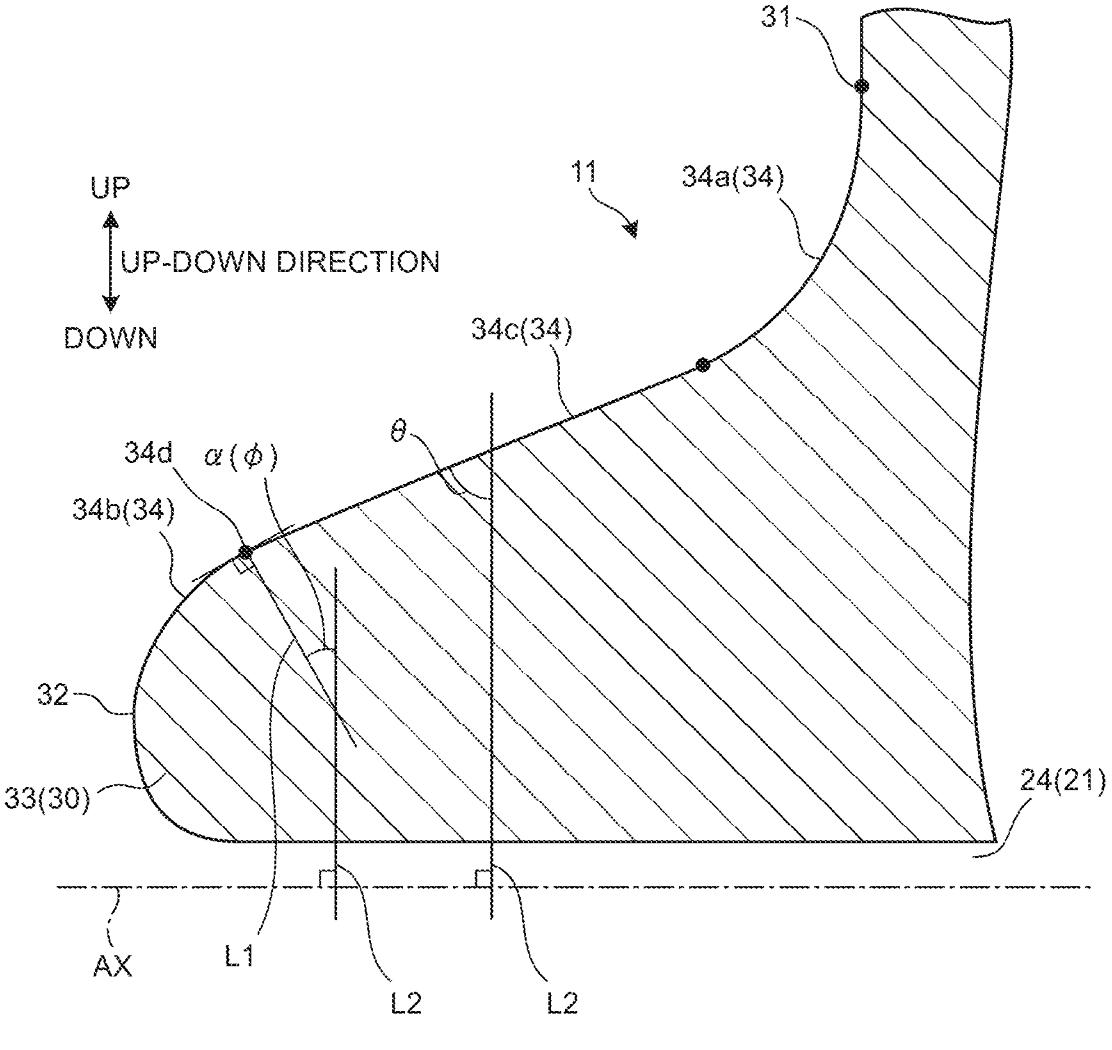
FIG. 6 is a schematic illustrating a cross-sectional configuration along C-C in FIG. 3.

FIG. 6 is a schematic illustrating a cross-sectional configuration along C-C in FIG. 3. FIG. 6 illustrates a cross section of the unit protrusion 33 at the point farthest apart from the parting surface 12 in the rotating direction about the central axis AX (at the position of $\varphi=90°$ in FIG. 5). In FIG. 6, an outer peripheral surface 34 of the unit protrusion 33 includes the base-end side curved portion 34*a*, the tip-end side curved portion 34*b*, and the connecting portion 34*c*.

The base-end side curved portion 34*a* is a portion forming the base end portion 31. The base-end side curved portion 34*a* exhibits an arc shape having a predetermined radius R, in the cross section illustrated in FIG. 6, for example. The radius R may be set in advance.

The tip-end side curved portion 34*b* is a portion forming the tip end portion 32. The tip-end side curved portion 34*b* has a curved shape, such as an arc shape. The shape of the tip-end side curved portion 34*b* may be set in advance, or may be set in accordance with a connecting position 34*d*, which will be described later.

The connecting portion 34*c* connects the base-end side curved portion 34*a* and the tip-end side curved portion 34*b*. The connecting portion 34*c* may include a linear portion, for example. It is also possible for the connecting portion 34*c* to be entirely linear, or not to include any linear portion. The shape of the connecting portion 34*c* may be set in advance, or may be set in accordance with the connecting position 34*d*, which will be described later.

The base-end side curved portion 34*a* and the connecting portion 34*c* are smoothly connected to each other. The tip-end side curved portion 34*b* and the connecting portion 34*c* are also smoothly connected to each other.

At a position at which a predetermined angle $\varphi$ from the parting surface 12 in the rotating direction about the central axis AX is obtained, the connecting position 34*d* between the tip-end side curved portion 34*b* and the connecting portion 34*c* may be set in the following manner. That is, if the angle formed by a first virtual line L1 orthogonal to a line tangent to the connecting position 34*d* and a second virtual line L2 perpendicular to the central axis AX is $\alpha(\varphi)$, the connecting position 34*d* is set so as to satisfy $\alpha(\varphi) \propto (\sin\varphi)^n$ (where n is a positive real number). In this embodiment, the value n may be set to a natural number, for example. When the value n is a natural number, n may be set to 6, for example. When the value n is a natural number, the number may be any natural number equal to or more than 5 and equal to or less than 7, without limitation to 6.

An angle θ formed by the second virtual line L2 and the connecting portion 34*c* may be set to any angle that becomes smallest when φ=90°. In the example illustrated in FIG. 6, θ=60°, but the angle θ is not limited thereto.

Figure 7:
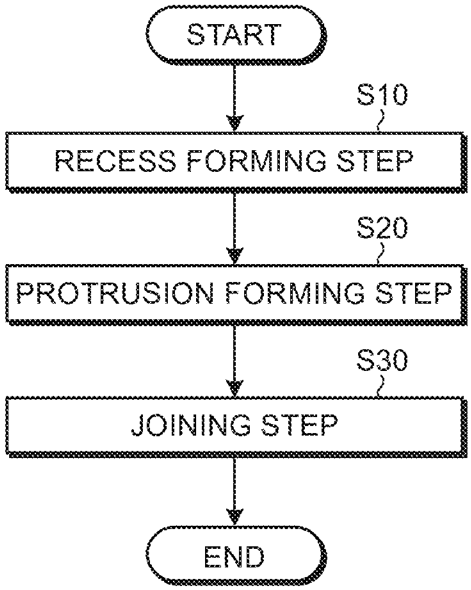
FIG. 7 is a flowchart illustrating one example of a method of manufacturing an accelerating cavity according to the embodiment.

A method of manufacturing the accelerating cavity 100 having the configuration described above will now be explained. FIG. 7 is a flowchart illustrating one example of a method of manufacturing the accelerating cavity 100 according to the embodiment. As illustrated in FIG. 7, the method of manufacturing the accelerating cavity 100 according to the embodiment includes a recess forming step S10, a protrusion forming step S20, and a joining step S30.

Figure 8:
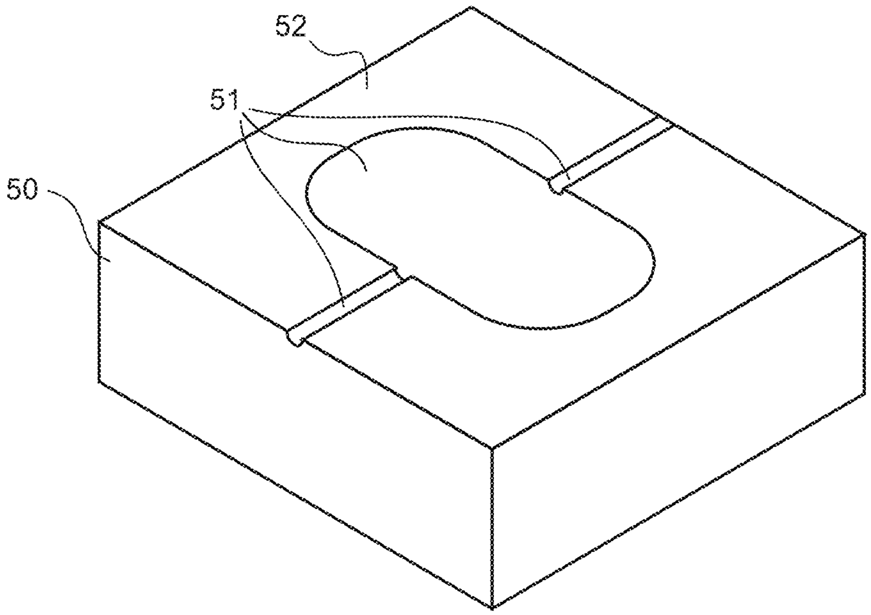
FIG. 8 is a schematic illustrating one example of a recess forming process.

FIG. 8 is a schematic illustrating one example of the recess forming process S10. In FIG. 8, one of the cells 20 is representatively illustrated. As illustrated in FIG. 8, at the recess forming step S10, recesses 51 corresponding to the cells 20 and the communicating portion 21 are formed by machining a machined surface 52 of a base material 50, the machined surface 52 being a surface corresponding to the parting surface 12.

Figure 9:
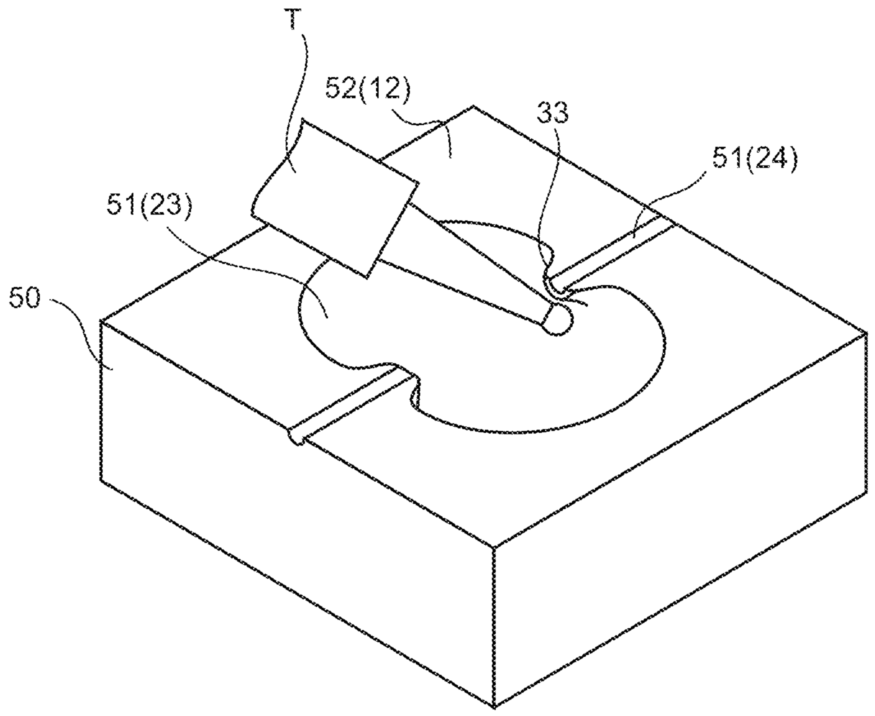
FIG. 9 is a schematic illustrating one example of a protrusion forming process.

FIG. 9 is a schematic illustrating one example of the protrusion forming process S20. FIG. 9 representatively illustrates one of the cells 20, in the same manner as in FIG. 8. As illustrated in FIG. 9, at the protrusion forming step S20, a machining tool T is inserted into the recesses 51 from the side of the machined surface 52, to form the unit protrusion 33 corresponding to the protrusion 30 such that the unit protrusion 33 has a shape becoming larger in the radial direction with respect to the central axis AX from the tip end portion 32 toward the base end portion 31 in the axial direction of the central axis AX. By forming the unit protrusion 33 on the base material 50, the part member 11 is achieved.

Because the unit protrusion 33 has a shape becoming larger in the radial direction with respect to the central axis AX from the tip end portion 32 toward the base end portion 31, when the machining tool T is inserted to machine a part of the unit protrusion 33 at a position separated from the machined surface 52 in the rotating direction about the central axis AX, it is possible to suppress the interference of the machining tool T with the unit protrusion 33.

At the joining step S30, the part members 11 thus formed are joined to each other. The part members 11 are joined in such a manner that the respective parting surfaces 12 face each other with a predetermined gap therebetween. By joining the part members 11, the accelerating cavity 100 is achieved.

The technical scope of the present invention is not limited to the embodiment described above, and changes may be made as appropriate, within the scope not deviating from the essence of the present invention.

Figure 10:
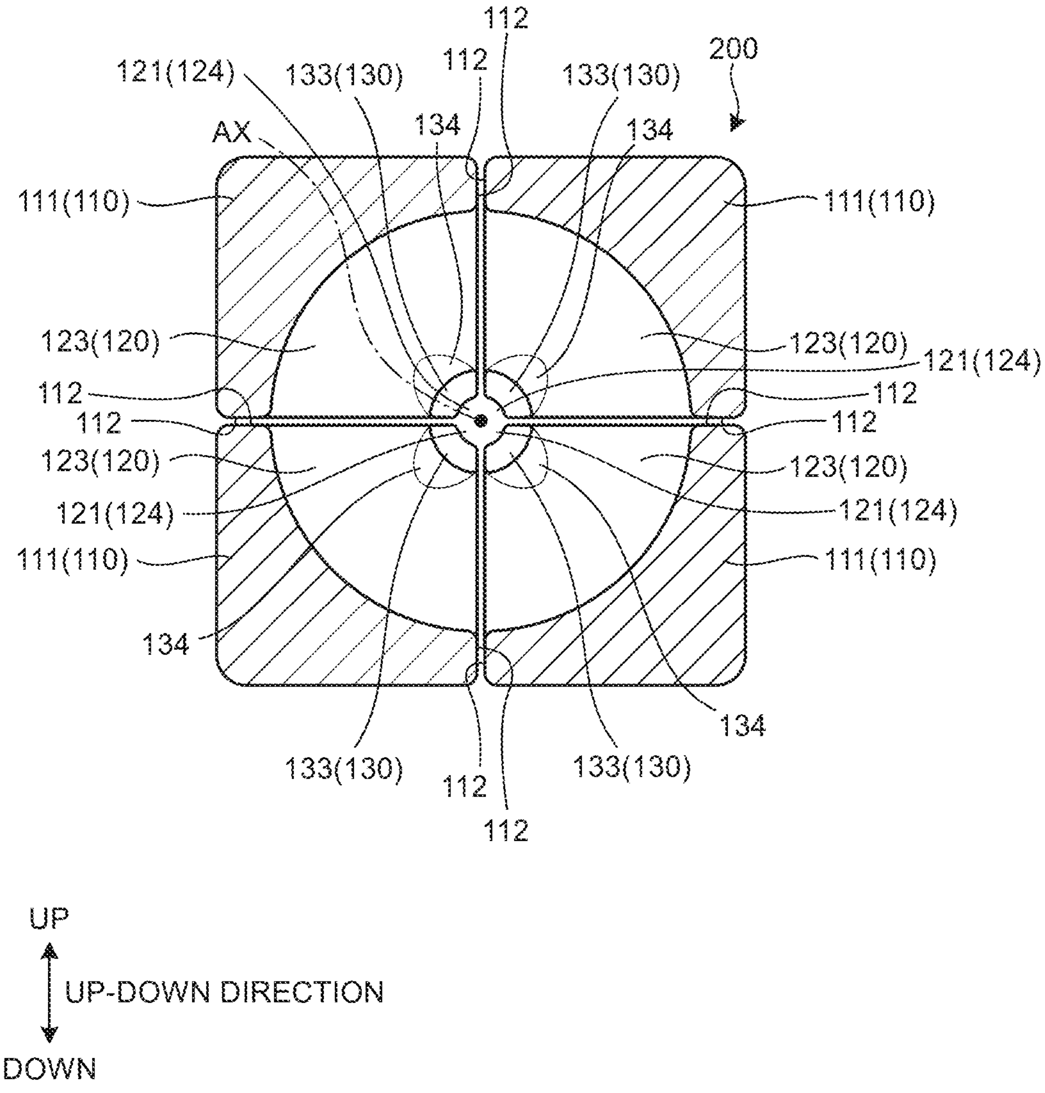
FIG. 10 is a schematic illustrating an accelerating cavity according to another example.

FIG. 10 is a schematic illustrating an accelerating cavity 200 according to another example. As illustrated in FIG. 10, the accelerating cavity 200 may have a housing 110 including three or more part members 111. In the example illustrated in FIG. 10, four part members 111 are provided. The four part members 111 are configured to have equal sizes in the rotating direction about the central axis AX, by being parted by planes passing through the central axis AX. Each of cells 120 is formed by combining unit cells 123 that are respectively provided to the four part members 111. A communicating portion 121 is formed by combining unit communicating portions 124 that are respectively provided to the four part members 111.

In the accelerating cavity 200, each of the part members 111 has two parting surfaces 112 that are orthogonal to each other. In this configuration, a protrusion 130 has a shape becoming larger in the radial direction as the shape is away from the parting surfaces 112 in the rotating direction about the central axis AX. In other words, a unit protrusion 133 provided to each of the part members 111 is configured in such a manner that an outer peripheral surface 134 becomes larger, in the rotating direction about the central axis AX, toward a direction that forms an angle φ f 45° with each one of the two parting surfaces 112.

In the example explained in FIG. 10, the accelerating cavity 200 is parted into four, but the same kind of description are applicable to configurations in which the accelerating cavity is parted into three, or five or more.

If the number of parts into which the accelerating cavity is parted is M, when the connecting position 34*d* between the tip-end side curved portion 34*b* and the connecting portion 34*c* of the protrusion 30 satisfies $$\alpha(\varphi) \propto (\sin\varphi)^n$$

the value of α(φ) becomes larger as the value of φ becomes larger; that is, α(φ) increases monotonically, when the value φ is within a range between zero or more and less than π/2M, and a range equal to or more than π/M and less than 3π/2M.

By contrast, when the value φ is within a range equal to or more than π/2M and less than π/M, and a range equal to or more than 3π/2M and less than 2π/M, the value α(φ) becomes smaller as the value φ becomes larger, that is, α(φ) decreases monotonically.

As described above, an accelerating cavity according to a first aspect of the present disclosure is the accelerating cavity 100 including: the housing 10 that is conductive, that has a tubular shape, and that is formed by joining the plurality of part members 11 parted by the planar parting surface 12 along the central axis AX; the plurality of cells 20 that are arranged in the housing 10 along the axial direction of the central axis AX of the housing 10, and that are connected to each other by the communicating portion 21 that allows charged particles to pass through; and the protrusion 30 that is disposed at a position surrounding the communicating portion 21 of each of the cells 20 in the housing 10, that protrudes toward an inner side of the cell 20 in the axial direction, and that has a shape becoming larger in the radial direction from the tip end portion 32 toward the base end portion 31 in the axial direction as the shape is away from the parting surface 12 in a rotating direction about the central axis AX.

With this configuration, the protrusion 30 has a shape becoming larger in the radial direction with respect to the central axis AX from the tip end portion 32 toward the base end portion 31. Therefore, while the part member 11 is being manufactured, when the machining tool T is inserted to machine a part of the unit protrusion 33 at a position separated from the machined surface 52 in the rotating direction about the central axis AX, it is possible to suppress the interference of the machining tool T with the unit protrusion 33. Thus, it is possible to provide an accelerating cavity 100 capable of providing the ease of manufacturing.

An accelerating cavity according to a second aspect of the present disclosure is the accelerating cavity according to the first aspect, in which the protrusion 30 includes the base-end side curved portion 34*a* forming the base end portion 31, the tip-end side curved portion 34*b* forming the tip end portion 32, and the connecting portion 34*c* connecting the base-end side curved portion 34*a* and the tip-end side curved portion 34*b*, the base-end side curved portion 34*a* and the connecting portion 34*c* are smoothly connected to each other, and the tip-end side curved portion 34*b* and the connecting portion 34*c* are smoothly connected to each other.

With this configuration, because the base-end side curved portion 34*a* and the connecting portion 34*c* are smoothly connected to each other, and the tip-end side curved portion 34*b* and the connecting portion 34*c* are smoothly connected to each other, the entire protrusion 30 has a smooth surface. Therefore, it is possible to suppress excessive concentration of voltage in a part of the protrusion 30 during the use of the accelerating cavity 100.

An accelerating cavity according to a third aspect of the present disclosure is the accelerating cavity according to the second aspect, in which, in a cross-sectional view across a plane passing the central axis AX, the base-end side curved portion 34*a* exhibits an arc shape, and the connecting portion 34*c* includes a linear portion.

With this configuration, it is possible to easily achieve a design of the protrusion 30 in which the base end portion 31 becomes larger in the radial direction.

An accelerating cavity according to a fourth aspect of the present disclosure is the accelerating cavity according to the second aspect or the third aspect, in which at a position at which a predetermined angle φ from the parting surface 12 in the rotating direction about the central axis AX is obtained, the connecting position 34*d* between the tip-end side curved portion 34*b* and the connecting portion 34*c* is set so as to satisfy $$\alpha(\varphi) \propto (\sin\varphi)^n$$

where α(φ) is an angle formed by the first virtual line orthogonal to a line tangent to the connecting position 34*d* and the second virtual line perpendicular to the central axis AX, and n is a positive real number.

With this configuration, the tip end portion 32 of the protrusion 30 can be designed easily and appropriately.

A method of manufacturing an accelerating cavity according to a fifth aspect of the present disclosure is a method for manufacturing an accelerating cavity including the housing 10 that is conductive, that has a tubular shape, and that is formed by joining the plurality of part members 11 parted by the planar parting surface 12 along the central axis AX; the plurality of cells 20 that are arranged in the housing 10 along the axial direction of the central axis AX of the housing 10, and that are connected to each other by the communicating portion 21 that allows charged particles to pass through; and the protrusion 30 that is disposed at a position surrounding the communicating portion 21 of each of the cells 20 in the housing 10, and that protrudes toward an inner side of the cell 20 in the axial direction, the method includes: a step of forming the recess 51 corresponding to the plurality of cells 20 and the communicating portion 21 by machining the machined surface 52 of a base material, the machined surface 52 being a surface corresponding to the parting surface 12; and a step of forming the unit protrusion 33 corresponding to the protrusion 30 such that the unit protrusion 33 has a shape becoming larger in the radial direction with respect to the central axis AX from the tip end portion 32 toward the base end portion 31 in the axial direction of the central axis AX by inserting a machining tool T into the recess 51 from a side of the machined surface 52.

With this configuration, because the unit protrusion 33 has a shape becoming larger in the radial direction with respect to the central axis AX from the tip end portion 32 toward the base end portion 31, when the machining tool T is inserted to machine a part of the unit protrusion 33 at a position separated from the machined surface 52 in the rotating direction about the central axis AX, it is possible to suppress the interference of the machining tool T with the unit protrusion 33. Thus, it is possible to provide a method for manufacturing accelerating cavity 100 capable of providing the ease of manufacturing.

REFERENCE SIGNS LIST

10 Housing
11, 111 Part member
12, 112 Parting surface
20 Cell
21 Communicating portion
30, 130 Protrusion
31 Base end portion
32 Tip end portion
33, 133 Unit protrusion
34 Outer peripheral surface
34*a* Base-end side curved portion
34*b* Tip-end side curved portion
34*c* Connecting portion
34*d* Connecting position
50 Base material
51 Recess
52 Machined surface
100, 200 Accelerating cavity
AC Accelerator
AX Central axis
BS Beam source
L1 First virtual line
L2 Second virtual line
M Charged particles
S10 Recess forming step
S20 Protrusion forming step
S30 Joining step
T Machining tool

The invention claimed is:

1. An accelerating cavity comprising:

a housing that is conductive, has a tubular shape, and is formed by joining a plurality of part members parted by a planar parting surface along a central axis;

a plurality of cells that are arranged in the housing along an axial direction of the central axis of the housing, and are connected to each other by a communicating portion that allows charged particles to pass through; and a protrusion that is disposed at a position surrounding the communicating portion of each of the cells in the housing, protrudes toward an inner side of the cell in the axial direction, and has a shape becoming larger in a radial direction from a tip end portion toward a base end portion in the axial direction as the shape is away from the parting surface in a rotating direction about the central axis, wherein the protrusion includes a base-end side curved portion forming the base end portion, a tip-end side curved portion forming the tip end portion, and a connecting portion connecting the base-end side curved portion and the tip-end side curved portion, the base-end side curved portion and the connecting portion are smoothly connected to each other, and the tip-end side curved portion and the connecting portion are smoothly connected to each other, and at a position at which a predetermined angle φ from the parting surface in the rotating direction about the central axis, a connecting position between the tip-end side curved portion and the connecting portion is set so as to satisfy $$\alpha(\varphi) \propto (\sin\varphi)^n$$

where α(φ) is an angle formed by a first virtual line orthogonal to a line tangent to the connecting position and a second virtual line perpendicular to the central axis, and n is a positive real number.

2. The accelerating cavity according to claim 1, wherein, in a cross-sectional view along a plane passing the central axis, the base-end side curved portion exhibits an arc shape, and the connecting portion includes a linear portion.

3. A method of manufacturing an accelerating cavity including: a housing that is conductive, has a tubular shape, and is formed by joining a plurality of part members parted by a planar parting surface along a central axis; a plurality of cells that are arranged in the housing along an axial direction of the central axis of the housing, and are connected to each other by a communicating portion that allows charged particles to pass through; and a protrusion that is disposed at a position surrounding the communicating portion of each of the cells in the housing, and protrudes toward an inner side of the cell in the axial direction, the method comprising:

forming a recess corresponding to the plurality of cells and the communicating portion by machining a machined surface of a base material, the machined surface being a surface corresponding to the parting surface; and forming a portion corresponding to the protrusion such that the portion has a shape becoming larger in a radial direction with respect to the central axis from a tip end portion toward a base end portion in the axial direction of the central axis by inserting a machining tool into the recess from a side of the machined surface, wherein in the forming a portion corresponding to the protrusion, the protrusion includes a base-end side curved portion forming the base end portion, a tip-end side curved portion forming the tip end portion, and a connecting portion connecting the base-end side curved portion and the tip-end side curved portion, the base-end side curved portion and the connecting portion are smoothly connected to each other, and the tip-end side curved portion and the connecting portion are smoothly connected to each other, and at a position at which a predetermined angle φ from the parting surface in the rotating direction about the central axis, a connecting position between the tip-end side curved portion and the connecting portion is set so as to satisfy $$\alpha(\varphi) \propto (\sin\varphi)^n$$

where α(φ) is an angle formed by a first virtual line orthogonal to a line tangent to the connecting position and a second virtual line perpendicular to the central axis, and n is a positive real number.

* * * * *